United States Patent [19]
Hange

[11] Patent Number: 5,826,435
[45] Date of Patent: Oct. 27, 1998

[54] SOLAR POWERED VEHICLE AIR CONDITIONER

[76] Inventor: Jamie Hange, 1980 Three Mile Run Rd., Perkasie, Pa. 18944

[21] Appl. No.: 828,055

[22] Filed: Mar. 28, 1997

[51] Int. Cl.$^6$ ................................................ F25B 27/00
[52] U.S. Cl. .............................. 62/190; 62/235.1; 62/408
[58] Field of Search .................................. 62/235.1, 440, 62/457.1, 457.9, 190, 408, 244, 239, 404, 407

[56] References Cited

U.S. PATENT DOCUMENTS

| | | | |
|---|---|---|---|
| 4,307,575 | 12/1981 | Popinski | 62/235.1 |
| 4,658,599 | 4/1987 | Kajiwara | 62/235.1 |

Primary Examiner—John M. Sollecito

[57] ABSTRACT

A new Solar Powered Vehicle Air Conditioner for retaining a comfortable temperature within a vehicle during hot days when a user leaves the vehicle. The inventive device includes an energy efficient air conditioner having a vent, a fan control and a thermostat control, and a solar panel electrically connected to the energy efficient air conditioner for providing electrical power to the energy efficient air conditioner.

2 Claims, 2 Drawing Sheets

SOLAR POWERED VEHICLE AIR CONDITIONER

BACKGROUND OF THE INVENTION

1. Field of the Invention

The present invention relates to Vehicle Cooling Devices and more particularly pertains to a new Solar Powered Vehicle Air Conditioner for retaining a comfortable temperature within a vehicle during hot days when a user leaves the vehicle.

2. Description of the Prior Art

The use of Vehicle Cooling Devices is known in the prior art. More specifically, Vehicle Cooling Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Cooling Devices include U.S. Pat. No. 4,658,597; U.S. Pat. No. 5,089,764; U.S. Pat. No. 4,367,633; U.S. Pat. No. 4,955,203; U.S. Pat. No. 4,841,742; and U.S. Pat. No. 5,373,703.

While these devices fulfill their respective, particular objectives and requirements, the aforementioned patents do not disclose a new Solar Powered Vehicle Air Conditioner. The inventive device includes an energy efficient air conditioner having a vent, a fan control and a thermostat control, and a solar panel electrically connected to the energy efficient air conditioner for providing electrical power to the energy efficient air conditioner.

In these respects, the Solar Powered Vehicle Air Conditioner according to the present invention substantially departs from the conventional concepts and designs of the prior art, and in so doing provides an apparatus primarily developed for the purpose of retaining a comfortable temperature within a vehicle during hot days when a user leaves the vehicle.

SUMMARY OF THE INVENTION

In view of the foregoing disadvantages inherent in the known types of Vehicle Cooling Devices now present in the prior art, the present invention provides a new Solar Powered Vehicle Air Conditioner construction wherein the same can be utilized for retaining a comfortable temperature within a vehicle during hot days when a user leaves the vehicle.

The general purpose of the present invention, which will be described subsequently in greater detail, is to provide a new Solar Powered Vehicle Air Conditioner apparatus and method which has many of the advantages of the Vehicle Cooling Devices mentioned heretofore and many novel features that result in a new Solar Powered Vehicle Air Conditioner which is not anticipated, rendered obvious, suggested, or even implied by any of the prior art Vehicle Cooling Devices, either alone or in any combination thereof.

To attain this, the present invention generally comprises an energy efficient air conditioner having a vent, a fan control and a thermostat control, and a solar panel electrically connected to the energy efficient air conditioner for providing electrical power to the energy efficient air conditioner.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Solar Powered Vehicle Air Conditioner apparatus and method which has many of the advantages of the Vehicle Cooling Devices mentioned heretofore and many novel features that result in a new Solar Powered Vehicle Air Conditioner which is not anticipated, rendered obvious, suggested, or even implied by any of the prior art Vehicle Cooling Devices, either alone or in any combination thereof.

It is another object of the present invention to provide a new Solar Powered Vehicle Air Conditioner which may be easily and efficiently manufactured and marketed.

It is a further object of the present invention to provide a new Solar Powered Vehicle Air Conditioner which is of a durable and reliable construction.

An even further object of the present invention is to provide a new Solar Powered Vehicle Air Conditioner which is susceptible of a low cost of manufacture with regard to both materials and labor, and which accordingly is then susceptible of low prices of sale to the consuming public, thereby making such Solar Powered Vehicle Air Conditioner economically available to the buying public.

Still yet another object of the present invention is to provide a new Solar Powered Vehicle Air Conditioner which provides in the apparatuses and methods of the prior art some of the advantages thereof, while simultaneously overcoming some of the disadvantages normally associated therewith.

Still another object of the present invention is to provide a new Solar Powered Vehicle Air Conditioner for retaining a comfortable temperature within a vehicle during hot days when a user leaves the vehicle.

Yet another object of the present invention is to provide a new Solar Powered Vehicle Air Conditioner which includes an energy efficient air conditioner having a vent, a fan control and a thermostat control, and a solar panel electrically connected to the energy efficient air conditioner for providing electrical power to the energy efficient air conditioner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
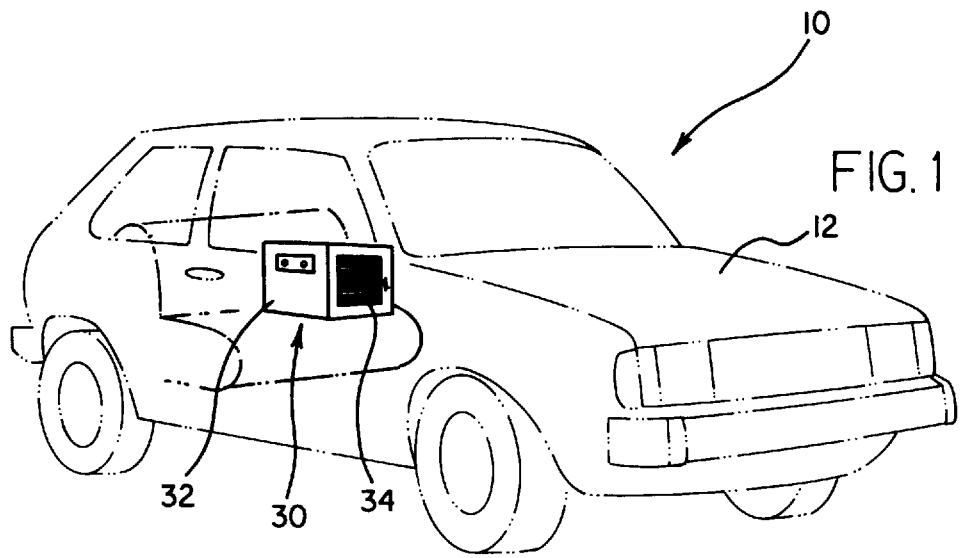
FIG. 1 is an upper perspective view of a new Solar Powered Vehicle Air Conditioner according to the present invention.
Figure 2:
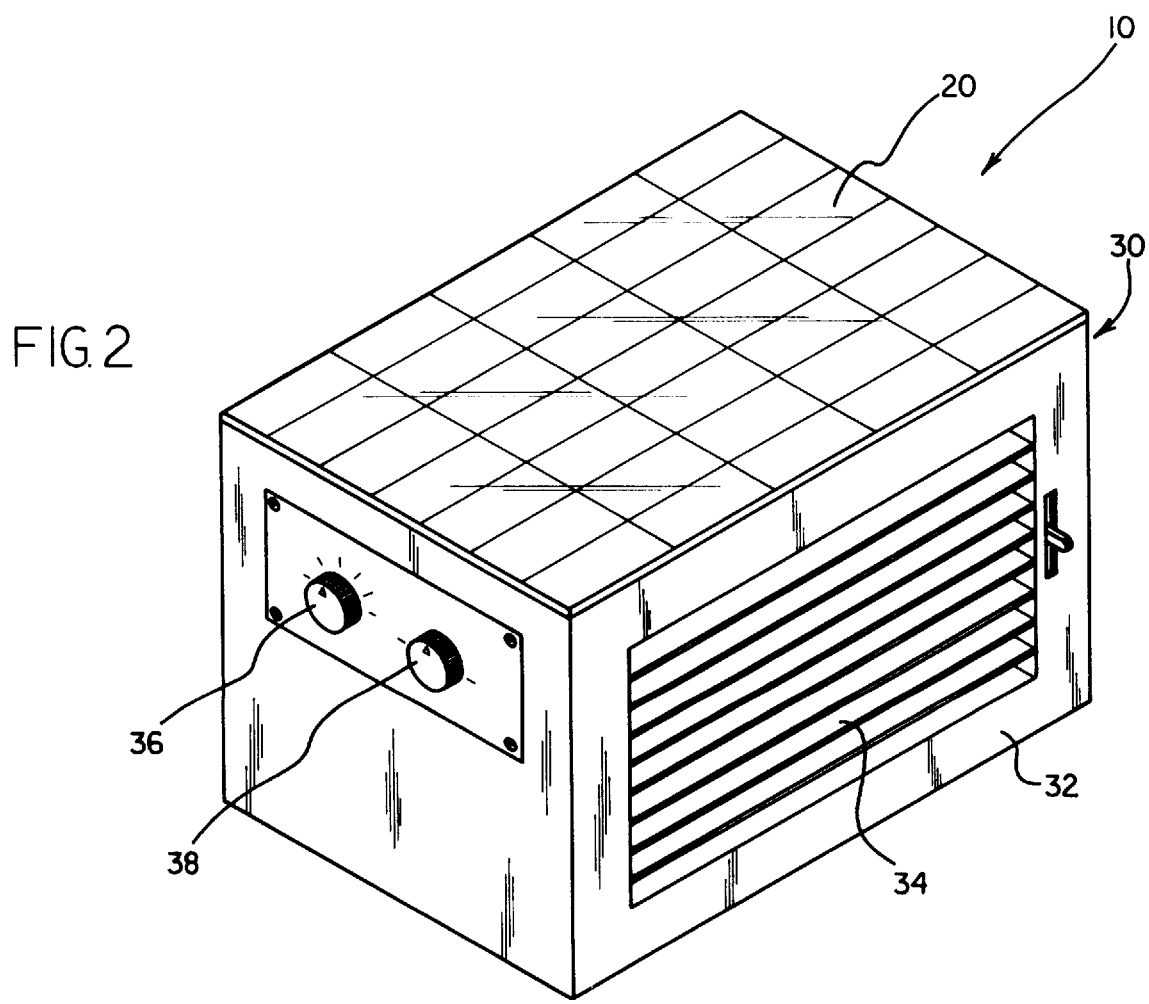
FIG. 2 is an upper perspective view of the present invention.
Figure 3:
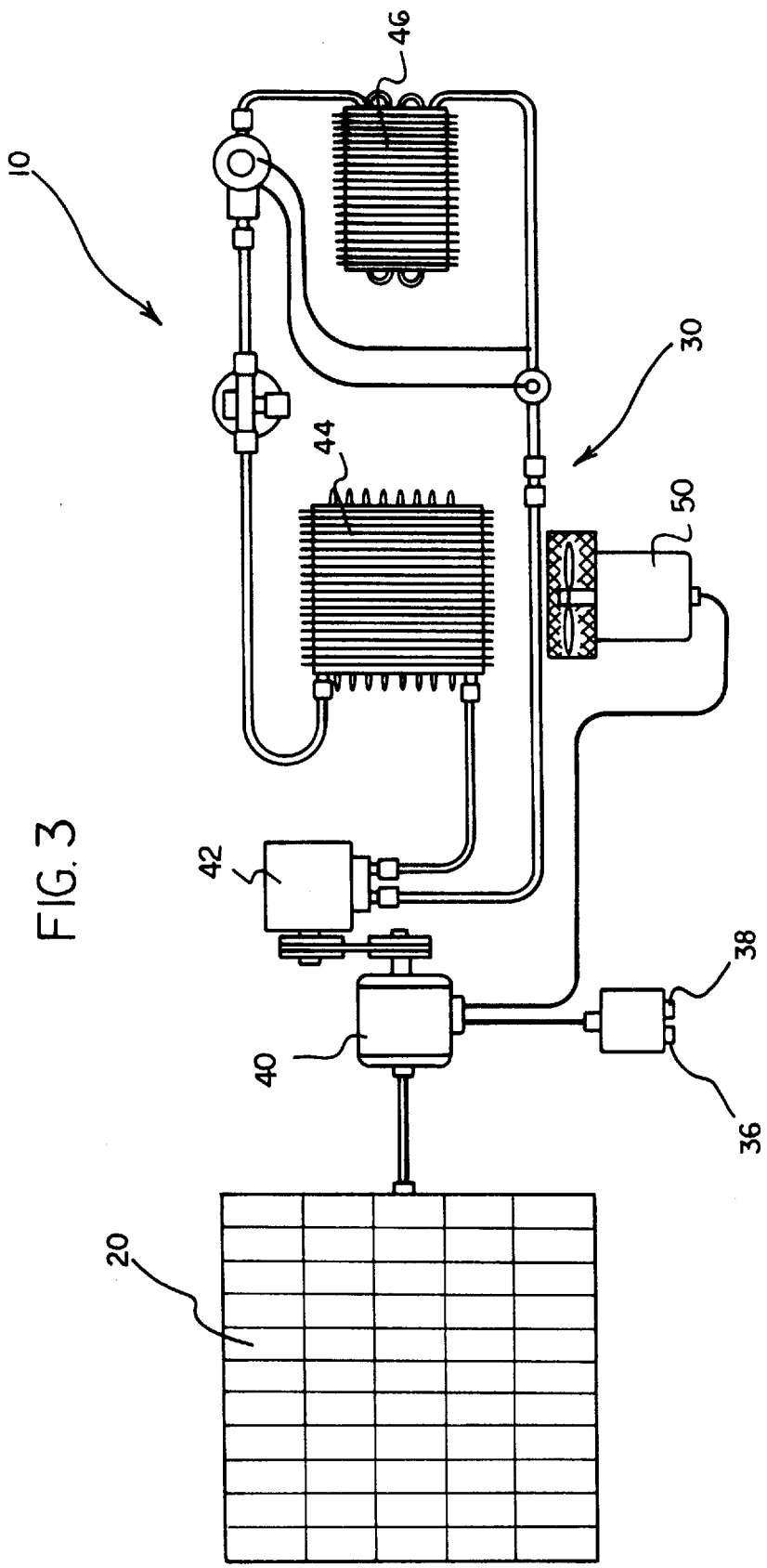
FIG. 3 is a schematic illustration of the present invention.

With reference now to the drawings, and in particular to FIGS. 1 through 3 thereof, a new Solar Powered Vehicle Air Conditioner embodying the principles and concepts of the present invention and generally designated by the reference numeral 10 will be described.

As best illustrated in FIGS. 1 through 3, the Solar Powered Vehicle Air Conditioner 10 comprises an energy efficient air conditioner 30 positionable within the vehicle 12 for retaining the comfortable temperature by forcing cool air through a vent 34, and a power source electrically connected to the energy efficient air conditioner 30 for providing electrical power to the energy efficient air conditioner 30.

The power source preferably comprises a solar panel 20 secured to a cornice of a housing 32 of the energy efficient air conditioner 30 as shown in FIGS. 2 and 3 of the drawings. The power source, in an alternative embodiment, further includes a power cord which is electrically coupleable to a conventional cigarette lighter within the vehicle 12. The energy efficient air conditioner 30 has a fan control 36 for allowing a user to control a rotational speed of a fan within the energy efficient air conditioner 30 as shown in FIG. 2 of the drawings. The energy efficient air conditioner 30 also has a thermostat control 38 for allowing the user to control a temperature within the vehicle 12.

FIG. 3 shows a schematic view of the air conditioning apparatus. Solar panel 20 provides power to electric motor 40. Electric motor 40 in turn provides rotational power to belt-driven compressor 42. Compressor 42 is connected to condenser 44 and evaporator 46. Fan 50 is also powered by electric motor 40 and is positioned proximate condenser 44 such that fan 50 provides circulation of air around condenser 44 such that the air is cooled by condenser 44 and distributed by fan 50.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable air conditioning system for use in a vehicle while the vehicle is not in use, the portable air conditioning system comprising:

a portable air conditioning unit having a housing adapted for easy placement in or removal from a passenger compartment of said vehicle, said housing having a top surface;

a plurality of solar panels positioned on the top surface;

said solar panels being for providing electrical power to said air conditioning unit;

a plurality of vents within said housing, said vents being positioned such that said air conditioning unit forces cooled air out of said housing through said vents;

adjustable directional venting means for urging the cooled air in a selected direction; and temperature control means for selecting a desired temperature.

2. A portable air conditioning system for use in a vehicle while the vehicle is not in use, the portable air conditioning system comprising:

a housing adapted for easy replacement in or removal from a passenger compartment of said vehicle having a top surface;

an electric motor positioned within said housing;

a belt driven compressor powered by said electric motor, said compressor being positioned within said housing;

said compressor being connected to a condenser and an evaporator, said condenser being for cooling air proximate said condenser;

a fan powered by said electric motor, said fan being positioned within said housing, said fan further being positioned proximate said condenser;

a plurality of solar panels positioned on the top surface, said solar panels being for providing electrical power to said electric motor;

a plurality of vents in said housing, said vents being positioned such that said fan forces cooled air out of said housing through said vents;

adjustable directional venting means for urging the cooled air in a selected direction; and temperature control means for selecting a desired temperature.

* * * * *